(12) United States Patent
O'Hara et al.

(10) Patent No.: US 12,743,085 B1
(45) Date of Patent: Sep. 22, 2026

(54) VISUAL LANGUAGE MODELS FOR PERCEPTION

(71) Applicant: Aurora Operations, Inc., Pittsburgh, PA (US)

(72) Inventors: Stephen O'Hara, Fort Collins, CO (US); Ariel Quinn, Boulder, CO (US)

(73) Assignee: Aurora Operations, Inc., Pittsburgh, PA (US)

( * ) Notice: Subject to any disclaimer, the term of this patent is extended or adjusted under 35 U.S.C. 154(b) by 33 days.

(21) Appl. No.: 18/929,058

(22) Filed: Oct. 28, 2024

Related U.S. Application Data

(63) Continuation of application No. 18/244,770, filed on Sep. 11, 2023, now Pat. No. 12,158,762.

(51) Int. Cl.

| | |
|---|---|
| ***G05D 1/246*** | (2024.01) |
| ***G05D 1/00*** | (2006.01) |
| ***G06F 40/284*** | (2020.01) |
| ***G06F 40/56*** | (2020.01) |
| ***G06V 20/56*** | (2022.01) |
| ***G06V 20/58*** | (2022.01) |

(52) U.S. Cl.
CPC ......... *G05D 1/0248* (2013.01); *G05D 1/0219* (2013.01); *G06F 40/284* (2020.01); *G06F 40/56* (2020.01); *G06V 20/582* (2022.01); *G06V 20/588* (2022.01)

(58) Field of Classification Search
CPC ..... G06F 40/284; G06F 40/56; G06V 20/582; G06V 20/588; G05D 2201/0213
See application file for complete search history.

(56) References Cited

U.S. PATENT DOCUMENTS

| | | | | |
|---|---|---|---|---|
| 2020/0293720 | A1 | 9/2020 | Tu | |
| 2023/0019211 | A1 | 1/2023 | Wang et al. | |
| 2023/0252795 | A1* | 8/2023 | Tong | G06V 20/56 382/104 |
| 2023/0325685 | A1* | 10/2023 | Caba Heilbron | G06V 10/764 |

OTHER PUBLICATIONS

"Learning Transferable Visual Models From Natural Language Supervision" to Radford et al., (Radford), 2021 p. 1-48, International Conference on Machine Learning (Year: 2021).

* cited by examiner

*Primary Examiner* — Kenneth J Malkowski
(74) *Attorney, Agent, or Firm* — Gray Ice Higdon

(57) ABSTRACT

A method is provided, that includes: receiving camera data from a perception system of an autonomous vehicle; and providing the camera data to a visual language model, where the visual language model includes a mapping of a corpus of images and a corpus of text to a common parameter space. The method further includes: receiving from the visual language model an output corresponding to one or more text tokens; accessing a configuration file comprising a plurality of text tokens representing a plurality of objects or events of interest to the autonomous vehicle; and identifying a respective object or event of interest in an environment of the autonomous vehicle by determining that a text token of the output matches a respective one of the plurality of text tokens in the configuration file. The autonomous vehicle can then be controlled based at least in part on the respective object or event of interest.

18 Claims, 7 Drawing Sheets

VISUAL LANGUAGE MODELS FOR PERCEPTION

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about an autonomous vehicle's surrounding environment, along with making and implementing decisions to appropriately control the autonomous vehicle given a current environment within which the autonomous vehicle is operating. For instance, for a current environment within which the autonomous vehicle is driving along a highway or a road, autonomous vehicles can encounter various objects, events or situations, such as animals crossing a road, a fire, road construction, uneven shoulders, and dust clouds.

SUMMARY

Implementations described herein are generally directed to detecting an object or event for an autonomous vehicle by using a visual language model to process sensor data (RGB images, light detection and ranging ("LiDAR") point clouds, radar images, etc.) captured by a perception system (e.g., one or more sensors such as vision sensors, LiDAR sensors, radar sensors) of the autonomous vehicle. The object or event can be, for instance, a stray animal within an environment of the autonomous vehicle, a fire caused by an accident, road construction ahead of the autonomous vehicle, uneven shoulders, dust clouds, a traffic cone in the middle of the road that the autonomous vehicle drives along, a pedestrian placing a traffic cone on a road that the autonomous vehicle drives along, etc. The visual language model can be, or include, a neural network trained on a plurality of image-text pairs. As a non-limiting example, the visual language model can be a contrastive language-image pre-training (CLIP) model that has been trained on millions or tens of millions (or more) pairs of (image, text). By using the visual language model to process the sensor data captured by the perception system of the autonomous vehicle, whether object(s) or event(s) affecting the operation of the autonomous vehicle exist in the environment of the autonomous vehicle can be determined, and the autonomous vehicle can be controlled accordingly in an efficient manner.

As a non-limiting practical example, the autonomous vehicle can drive in an environment where an event (or object) that is of interest to the autonomous vehicle occurs (or appears). For instance, the event can be a vehicle ahead of the autonomous vehicle catching fire (e.g., in the same lane as the autonomous vehicle or in a lane adjacent to the autonomous vehicle). The autonomous vehicle can include a perception system capturing the environment surrounding the autonomous vehicle. The perception system, for instance, can include one or more sensors (e.g., cameras) for capturing image data of the environment surrounding the autonomous vehicle.

Continuing with the non-limiting example, the image data captured by the one or more sensors can include an image capturing the event (or object) that is of interest to the autonomous vehicle. The image capturing the event (or object) that is of interest to the autonomous vehicle can be provided to a trained visual language model for processing. The trained visual language model can be included in the perception system of the autonomous vehicle, or can be separated from (but in communication with) the perception system of the autonomous vehicle. The trained visual language model can include, for instance, an image encoder and a text encoder that are jointly trained using a plurality of image-text pairs.

During training, the image encoder can process each image from the plurality of image-text pairs to generate a corresponding image embedding in a multi-modal embedding space, and the text encoder can process each text from the plurality of image-text pairs to generate a corresponding text embedding in the multi-modal embedding space. In other words, during training, the images from the plurality of image-text pairs and the texts from the plurality of image-text pairs are mapped to a common embedding space (i.e., the multi-modal embedding space). The image encoder and the text encoder are then trained to maximize a similarity measure (e.g., cosine similarity) between image embeddings and text embeddings that are from same pairs while minimizing a similarity measure between image embeddings and text embeddings that are not from same pairs.

Continuing with the non-limiting practical example, the perception system can include a detection engine that processes the image capturing the event (or object) that is of interest to the autonomous vehicle, using the image encoder (trained), to generate an image embedding of the image capturing the event in the multi-modal embedding space. In some implementations, prior to the image being processed using the image encoder, the image capturing the event (or the object) can be pre-processed (e.g., re-sized and/or have pixel values normalized to be within a range of 0~1).

In some implementations, the detection engine can further access a configuration file comprising a plurality of predefined text strings describing a plurality of objects or events of interest to the autonomous vehicle. In some implementations, the configuration file can be object-specific. For instance, the configuration file can list a plurality of text strings relating to traffic signs, including but not limited to, "stop sign", "yield sign", "speed limit sign", "speed limit advisory", "not turn on red", "no trucks", "emergency and authorized vehicles only", "merge sign", "HOV start", "HOV end", and "other traffic sign". Alternatively or additionally, the configuration file can list a plurality of text tokens, where each text token represents an object or event or scene that is of interest to autonomous vehicles. The text token can be, for instance, an ID number in a positive integer format (or can be a word, or a combination of numbers and letters). In these implementations, a plurality of text strings can be generated based on the plurality of text tokens listed in the configuration file. For example, assuming a text token of "01357" represents (or is configured to be mapped to) an object of "lens flare", a text string such as "a photo of lens flare" or "lens flare ahead" can be generated based on the text token (e.g., "01357").

In some implementations, the detection engine can process the plurality of predefined text strings, respectively, using the text encoder (trained), to generate a plurality of text embeddings in the multi-modal embedding space, where each of the text embeddings (that are generated by processing the plurality of predefined text strings) corresponds to one of the predefined text strings. In some implementations, prior to a text string being processed using the text encoder, the text string can be pre-processed into one or more text tokens. Each of the one or more text tokens, for instance, can be an ID or value (e.g., integer value) that corresponds to a word or sub-word of the text string. In these implementations, the one or more text tokens of the text string are processed directly using the text encoder as input, to generate a text embedding (e.g., vector representation) for the text (or text string) in the common parameter space.

The detection engine can further calculate a plurality of similarity measure (e.g., cosine distances) each between the image embedding of the image capturing the event in the multi-modal embedding space and one of the plurality of text embeddings that are generated by processing the plurality of predefined text strings. The detection engine can further normalize the plurality of similarity measures to generate a probability distribution, from which a plurality of probabilities indicating whether the image capturing the event matches one of the plurality of predefined text strings are generated.

For instance, the plurality of predefined text strings in the configuration file can include N predefined text strings: "fire ahead in highway", "lens flare ahead in highway", etc. In this instance, N probabilities each indicating whether the image capturing the event matches one of the plurality of predefined text strings are generated. Based on the N probabilities, the detection engine can determine whether any object or event described by one of the N predefined text strings is detected from the image. For instance, based on a probability (e.g., a confidence score of 0.8) which predicts whether the image (capturing the event) matches the predefined text string "fire ahead in highway" exceeds a predetermined threshold (e.g., 0.7), the detection engine can determine that the event captured in the image matches (or is described by) the predefined text string "fire ahead in highway", with a predicted accuracy score of approximately 0.8. Alternatively or additionally, the detection engine can be configured to output the predefined text string "fire ahead in highway" for the image capturing the event (e.g., a vehicle ahead of the autonomous vehicle catching fire). The autonomous vehicle can then be controlled in a timely manner based on the occurrence of the "fire" event which is detected from the image using the visual language model.

By using the techniques described herein, one or more technical advantages can be achieved. As one non-limiting example, the techniques described herein enable the autonomous vehicle to determine whether an object or event worth attention occurs within an environment surrounding the vehicle, and enables the autonomous vehicle to be controlled based on such determination. Utilization of a visual language model trained via contrastive learning in determining whether an object or event worth attention occurs within the environment surrounding the vehicle enables an efficient detection of the object or event worth attention, so that the autonomous vehicle can be controlled correspondingly in a timely manner.

The above description is provided as an overview of only some implementations disclosed herein for the sake of example. Those implementations, and other implementations, are described in additional detail herein. It should be understood that techniques disclosed herein can be implemented locally on a client device, remotely by server(s) connected to the client device via one or more networks, and/or both.

DETAILED DESCRIPTION

The various implementations discussed hereinafter are generally directed to using a visual language model for detecting object(s) or event(s) of interest to an autonomous vehicle (AV) from sensor data (e.g., collected by a perception system of the autonomous vehicle). The sensor data collected by the perception system can be, but is not limited to, video clip(s) or RGB image(s). For instance, the sensor data can also be, or can include, radar image(s), and/or light detection and ranging (LiDAR) point clouds. The object (or event) of interest to the AV can be a road sign, a stray animal, severe weather, or object/event that has a relatively low occurrence frequency but affects operation of the AV (when being parked or on a road). The visual language model can be trained using multiple image-text pairs, and be applied to perform zero-shot detection tasks for objects or events not captured in the multiple image-text pairs (that are used to train the visual language model). In some implementations, the images in the multiple image-text pairs can be RGB images. Optionally, a subset of those RGB images can depict traffic scenes. In some implementations, the visual language model trained using the multiple image-text pairs can be utilized to detect target object(s) or event(s) not captured in the subset of those RGB images that depict traffic scenes. In some implementations, the visual language model trained using the multiple image-text pairs can be utilized to detect target object(s) from LIDAR images or radar images (in addition to or instead of RGB images), despite the images in the multiple image-text pairs are all RGB images. The visual language model can also be utilized in other manners, and relevant descriptions are provided elsewhere in this disclosure. In some cases, features from different implementations or configurations may be combined or separated, as long as they do not contradict each other.

Figure 1:
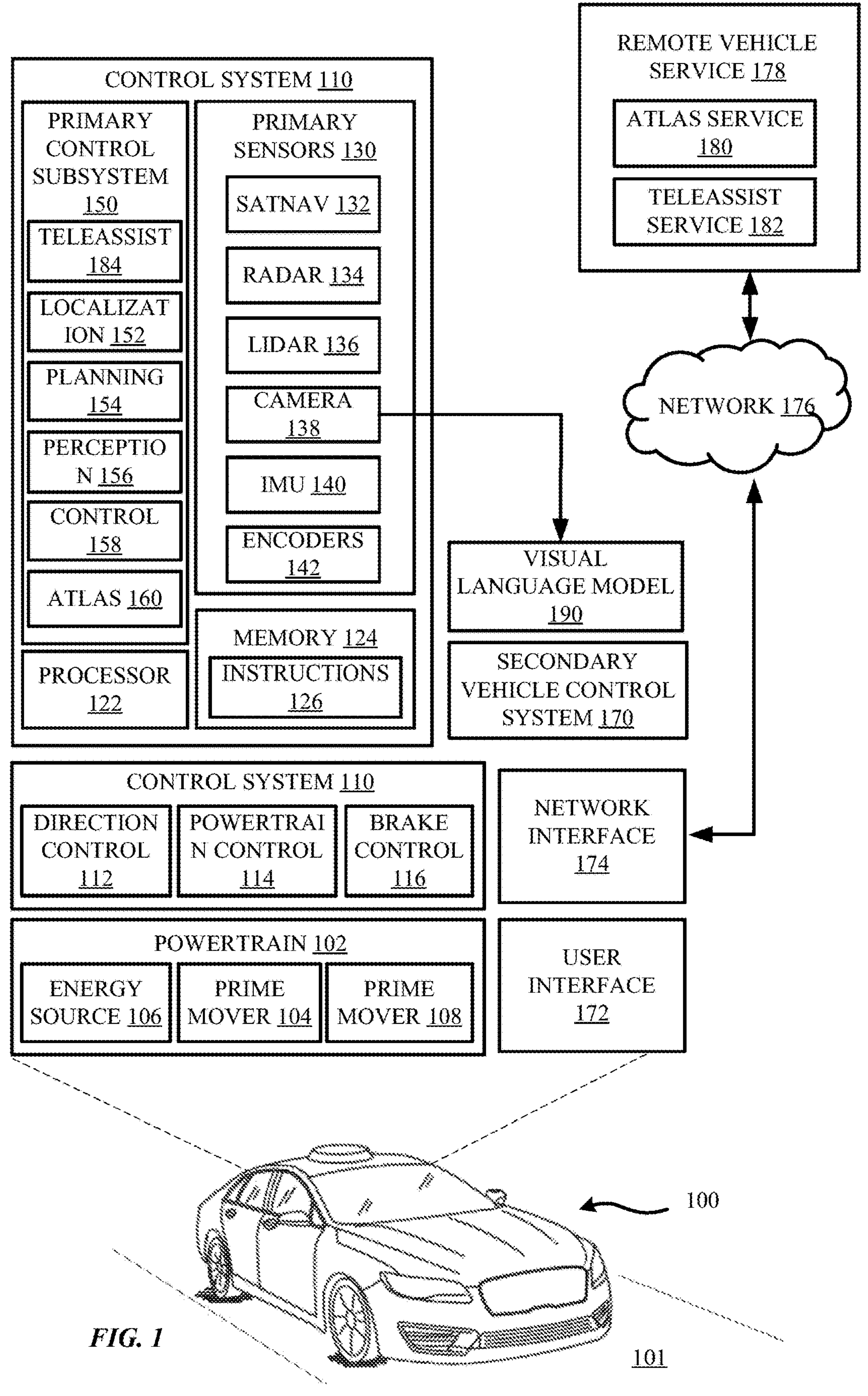
FIG. 1 illustrates an example hardware and software environment for an autonomous vehicle.

FIG. 1 illustrates an example autonomous vehicle 100 within which the various techniques disclosed herein may be implemented. The autonomous vehicle 100, for example, is shown driving on a road 101, and the autonomous vehicle 100 may include a powertrain 102 including a prime mover 104. The prime mover 104 can be powered by an energy source 106, and be capable of providing power to a drivetrain 108, as well as to a control system 110, where the control system 110 can include a direction control 112, a powertrain control 114 and a brake control 116. The autonomous vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source 106 may include a fuel system (e.g., providing gasoline, diesel, hydrogen, etc.), a battery system, solar panels or other renewable energy source, a fuel cell system, etc. The drivetrain 108 may include wheels and/or tires along with a transmission and/or any other mechanical drive components suitable for converting the output of the prime mover 104 into vehicular motion. The drivetrain 108 may further include: one or more brakes configured to controllably stop or slow the vehicle, and direction or steering components suitable for controlling the trajectory of the vehicle. The direction or steering components, for instance, can include a rack and pinion steering linkage that enables one or more wheels of the autonomous vehicle 100 to pivot about a generally vertical axis, thereby varying an angle of the rotational planes of the wheels relative to the longitudinal axis of the autonomous vehicle 100. In some implementations, combinations of powertrains and energy sources may be used, e.g., in the case of electric/gas hybrid vehicles, and in some instances, multiple electric motors (e.g., dedicated to individual wheels or axles) may be used as a prime mover. In the case of a hydrogen fuel cell implementation, the prime mover 104 may include one or more electric motors, and the energy source 106 may include a fuel cell system powered by hydrogen fuel.

The direction control 112 may include one or more actuators and/or sensors for controlling and receiving feedback from the direction or steering components to enable the vehicle to follow a desired trajectory. The powertrain control 114 may be configured to control the output of powertrain 102, e.g., to control the output power of prime mover 104, to control a gear of a transmission in drivetrain 108, etc., thereby controlling a speed and/or direction of the autonomous vehicle 100. The brake control 116 may be configured to control one or more brakes that slow or stop the autonomous vehicle 100, e.g., disk or drum brakes coupled to the wheels of the autonomous vehicle 100.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, the invention is not limited to the particular application of the herein-described techniques in an autonomous wheeled land vehicle.

In the illustrated implementation, autonomous control over the autonomous vehicle 100 (which may include various degrees of autonomy as well as selectively autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from an environment of the autonomous vehicle 100, for use in controlling the operation of the autonomous vehicle 100 within the environment. The primary sensor system 130, for example, may include a satellite navigation (SATNAV) sensor 132, a radio detection and ranging (RADAR) sensor 134, a light detection and ranging (LIDAR) sensor 136, a digital camera 138, an inertial measurement unit (IMU) 140, and/or one or more wheel encoders 142. The primary sensor system 130 may further include one or more acoustic sensors (not shown), such as microphones or other devices that capture audio data from the environment of the autonomous vehicle.

The SATNAV sensor 132 may be compatible with any of various satellite navigation systems such as GPS, GLONASS, Galileo, Compass, etc., and may be used to determine the location of the autonomous vehicle 100 on the Earth using satellite signals. The RADAR sensor 134, the LIDAR sensor 136, as well as the digital camera 138 (which may include various types of image-capturing devices capable of capturing still and/or video imagery), may be used to sense stationary and moving objects within the immediate vicinity of the autonomous vehicle 100. The IMU 140 may include multiple gyroscopes and accelerometers that are capable of detection linear and rotational motion of the autonomous vehicle 100 in three directions, while the one or more wheel encoders 142 may be used to monitor the rotation of one or more wheels of the autonomous vehicle 100.

The outputs of sensors 132-142 may be provided to a set of primary control subsystems 150, including, for example, a localization subsystem 152, a planning subsystem 154, a perception subsystem 156, and a control subsystem 158. The localization subsystem 152 is principally responsible for precisely determining the location and orientation (also sometimes referred to as "pose", which in some instances may also include one or more velocities and/or accelerations) of the autonomous vehicle 100 within its surrounding environment, and generally within some frame of reference. The planning subsystem 154 is principally responsible for planning a path of motion for the autonomous vehicle 100 over some timeframe given a desired destination as well as objects (static and/or moving) within the environment, while the perception subsystem 156 is principally responsible for detecting, tracking and/or identifying elements (e.g., objects) within the environment surrounding the autonomous vehicle 100. The control subsystem 158 is principally responsible for generating suitable control signals for controlling the various controls in the control system 110 in order to implement the planned path of the autonomous vehicle 100. Any number of, or all of, the localization subsystem 152, planning subsystem 154, perception subsystem 156, and control subsystem 158 may have associated data that is generated and/or utilized in connection with the operation thereof, and that which may be communicated to a teleassist system 184 in some implementations.

In various implementations, the outputs of sensors 132-142 may be provided to one or more models for processing by the one or more models. For instance, camera data captured by the digital camera 138 (and/or other camera, vision, or other types of sensors not illustrated in FIG. 1) can be provided to a visual language model 190 for processing by the visual language model 190. Components and training of the visual language model 190 can be found in FIGS. 2A~2B of the present disclosure.

In addition, an atlas or map subsystem 160 may be provided in the illustrated implementations to describe the elements within an environment and the relationships therebetween. The atlas subsystem 160 may be accessed by each of the localization, planning, perception, and control subsystems 152-156 to obtain various information about the environment for use in performing their respective functions. The atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, the atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by the autonomous vehicle 100 may be used in other implementations, including systems based upon absolute positioning. Furthermore, it will be appreciated that at least some of the map data that is generated and/or utilized by the atlas subsystem 160 may be communicated to the teleassist system 184 in some implementations.

It will be appreciated that the collection of components illustrated in FIG. 1 for the primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while the subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executable by one or more processors 122. It will be further appreciated that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in the primary vehicle control system 120 may be networked in various manners.

In some implementations, the autonomous vehicle 100 may also include a secondary vehicle control system 170, which may be used as a redundant or backup control system for the autonomous vehicle 100. In some implementations, secondary vehicle control system 170 may be capable of fully operating the autonomous vehicle 100 in the event of an adverse event in the primary vehicle control system 120, while in other implementations, the secondary vehicle control system 170 may only have limited functionality, e.g., to perform a controlled stop of the autonomous vehicle 100 in response to an adverse event (e.g., an emergency vehicle fast approaches the autonomous vehicle 100 from behind) detected using the primary vehicle control system 120. In still other implementations, the secondary vehicle control system 170 may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the autonomous vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in the autonomous vehicle 100 outside of the purposes of autonomous control, e.g., to control entertainment systems, to operate doors, lights, convenience features, etc.

In addition, for additional storage, the autonomous vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, the autonomous vehicle 100 may include a user interface (I/F) 172 to enable the autonomous vehicle 100 to receive a number of inputs from a user or an operator (e.g., a remote teleassist operator of the teleassist subsystem 184), and to present outputs for the user or the operator, via, for instance, one or more displays, touchscreens, voice and/or gesture interfaces, buttons and other tactile controls, etc.

Otherwise, user input may be received via another computer or electronic device, e.g., via an app on a mobile device or via a web interface, e.g., from a remote operator.

Moreover, the autonomous vehicle 100 may include one or more network interfaces (I/Fs), e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which the autonomous vehicle 100 receives environmental and other data for use in autonomous control thereof. In the illustrated implementations, for example, the autonomous vehicle 100 may be in communication with a cloud-based remote vehicle service 178 including, at least for the purposes of implementing various functions described herein, an atlas or map service or system 180 and a teleassist service or system 182. The atlas or map service or system 180 may be used, for example, to maintain a global repository describing one or more geographical regions of the world, as well as to deploy portions of the global repository to one or more autonomous vehicles (e.g., including the autonomous vehicle 100), to update the global repository based upon information received from one or more autonomous vehicles, and to otherwise manage the global repository. The teleassist service or system 182 may be used, for example, to provide teleassist support to the autonomous vehicle 100, e.g., through communication with the teleassist subsystem 184 resident in the primary vehicle control system 120, as will be discussed in greater detail below.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the autonomous vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while the invention has and hereinafter will be described in the context of fully functioning computers and systems, it will be appreciated that the various implementations described herein are capable of being distributed as a program product in a variety of forms, and that the invention applies equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary hardware and/or software components illustrated in FIG. 1 is not intended to limit the present invention. Indeed, those skilled in the art will recognize that other alternative or additional hardware and/or software components may be used without departing from the scope of the invention.

Operating the autonomous vehicle 100 in the complex and dynamic environments within which automobiles regularly operate often necessitates handling a diverse array of conditions that, while comparatively uncommon, are still regularly encountered by the autonomous vehicle 100 or other autonomous vehicles over time. Autonomously handling these uncommon conditions in both a performant and safe way can be challenging, and some proposed approaches to addressing these uncommon conditions incorporate the use of a visual language model to automatically detect object(s) or event(s) for a vehicle (e.g., autonomous vehicle, "AV") within an environment of the vehicle. This enables the vehicle to be automatically controlled responsive to the detected object(s) or event(s) that are of interest (e.g., which affect operations of the vehicle) to the vehicle.

Figure 2A:
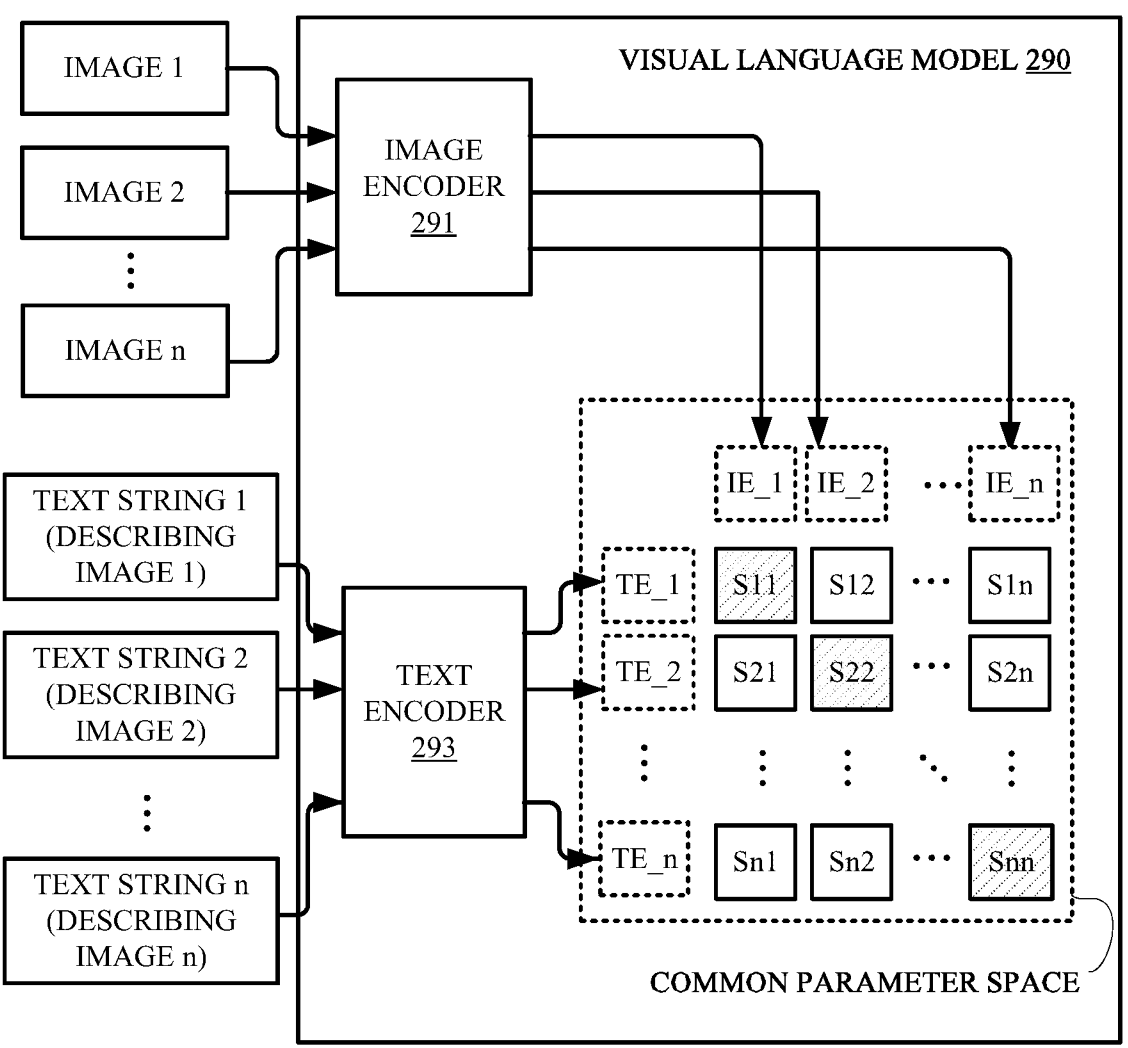
FIG. 2A is a block diagram illustrating a visual language model having an image encoder and a text encoder trained jointly using multiple pairs of image-text string, consistent with some implementations.

FIG. 2A is a block diagram illustrating a visual language model having an image encoder and a text encoder trained jointly using multiple image-text string pairs, consistent with some implementations. A visual language model 290 (the same as or similar to the visual language model 190 in FIG. 1) can include an image encoder 291 that maps one or more images (image 1, image 2, . . . , image n) to a common parameter space. For instance, a first image (i.e., image 1) can be processed using the image encoder 291 to generate a first image embedding IE_1 in the common parameter space, a second image (i.e., image 2) can be processed using the image encoder 291 to generate a second image embedding IE_2 in the common parameter space, . . . , and an $n^{th}$ image (i.e., image n) can be processed using the image encoder 291 to generate an $n^{th}$ image embedding IE_n in the common parameter space. The first, second, . . . , and the $n^{th}$ image embeddings can be, for instance, in the form of an N-dimensional vector that numerically represents the first, second, . . . , and the $n^{th}$ image.

In some implementations, the image encoder 291 can be, or can include, a ResNet or vision transformer (ViT).

The visual language model 290 can further include a text encoder 293 that maps one or more text strings (text string 1, text string 2, . . . , text string n) to the common parameter space. A first text string (i.e., text string 1) can be processed using the text encoder 293 to generate a first text embedding TE_1 in the common parameter space, a second text string (i.e., text string 2) can be processed using the text encoder 293 to generate a second text embedding TE_2 in the common parameter space, . . . , and an $n^{th}$ text string (i.e., text string n) can be processed using the text encoder 293 to generate an $n^{th}$ text embedding TE_n in the common parameter space. The first, second, . . . , and the $n^{th}$ text embeddings can be, for instance, in a form of an N-dimensional vector that numerically represents the first, second, . . . , and the $n^{th}$ text string.

In some implementations, the text encoder 293 can be, or can include, a multi-layer text transformer.

In various implementations, text string 1 can be a natural language description of image 1, text string 2 can be a natural language description of image 2, and text string n can be a natural language description of image n. In other words, text string 1 can be paired with image 1, text string 2 can be paired with image 2, . . . , and text string n can be paired with image n. In this case, the image encoder 291 and the text encoder 293 can be trained jointly using the multiple image-text pairs (i.e., <image 1, text string 1> <image 2, text string 2> . . . <image n, text string n>). For example, parameters of the image encoder 291 and parameters of the text encoder 293 can be modified to maximize a similarity measure between image embeddings and text embeddings that correspond to the same pair of image and text string, while minimizing similarity measures between image embeddings and text embeddings that do not correspond to the same pair of image and text string.

In other words, during training, parameters of the image encoder 291 and parameters of the text encoder 293 can be modified simultaneously to maximize S11 (which is a similarity measure between image embedding IE_1 of image 1 and text embedding TE_1 of text string 1), S22 (which is a similarity measure between image embedding IE_2 of image 2 and text embedding TE_2 of text string 2), . . . , and Snn (which is a similarity measure between image embedding IE_n of image n and text embedding TE_n of text string n), while minimizing all other similarity measures (i.e., S21, S12, S1*n*, Sn1, S2*n*, S2*n*, . . . , Snn). The similarity measure, for instance, can be a cosine distance between an image embedding of an image in the common parameter space and a text embedding of a text string in the common parameter space. Alternatively, the similarity measure can be a dot product similarity determined by applying a dot product operation on an image embedding and a text embedding. In this case, the image embedding and the text embedding may need to be normalized, and the dot product operation is applied to the normalized image embedding and the normalized text embedding. The similarity measure may also be determined or learned in other manners (e.g., in spaces not vector-based), and is not limited to descriptions provided herein. Once jointly trained, the image encoder 291 and the text encoder 293 can be stored locally or remotely for future data processing.

In various implementations, the visual language model 290 can further include a classifier (e.g., a linear classifier not illustrated) having one or more fully connected layers stacked on top of the image encoder 291. The classifier can be trained using additional data (e.g., labeled data such as an image capturing a road sign, which is paired with a label specifying the road sign, e.g., "stop sign") that is in addition to the aforementioned multiple image-text string pairs. During training of the classifier, parameters of the image encoder 291 (and/or the text encoder 293) can be frozen (remain unchanged), while one or more parameters of the one or more fully connected layers (i.e., the classifier) is being updated, e.g., based on comparing an output of the classifier in processing the image capturing the "stop sign" with the label of "stop sign". The output of the classifier in processing the image capturing the "stop sign" can indicate a specific road sign (and/or a corresponding confidence score) based on processing the image capturing the "stop sign".

Figure 2B:
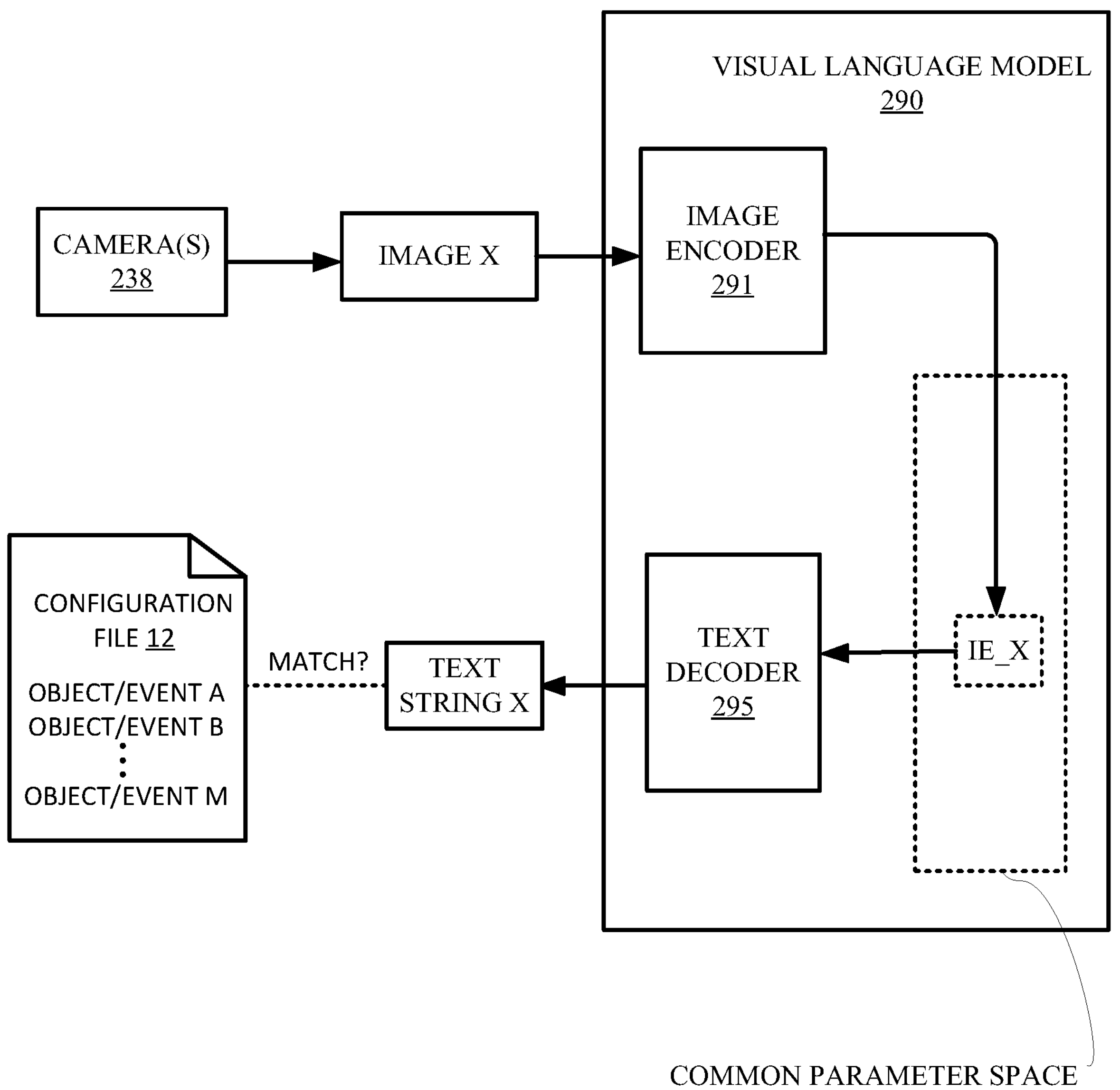
FIG. 2B is a block diagram illustrating use of a visual language model in classifying image data, consistent with some implementations.

FIG. 2B is a block diagram illustrating use of a visual language model in detecting an object or event of interest to an autonomous vehicle, consistent with some implementations. As shown in FIG. 2B, image data captured by one or more cameras 238 (e.g., the camera 138 in FIG. 1) can include image X, and image X can be provided to the image encoder 291 of the visual language model 290. The image encoder 291 can be trained as illustrated in FIG. 2A. Image X can be processed using the image encoder 291 as input, to generate an image embedding IE_X in the common parameter space. It's noted that in some implementations, instead of or in addition to traditional image data such as RGB images, sensor data such as LIDAR point clouds captured using LIDAR sensors (or a radar images captured using radar sensors) can be provided to the image encoder 291 of the visual language model 290, where the image encoder 291 of the visual language model 290 can map a LIDAR image (or radar image) to a corresponding image embedding in the common parameter space. It's also noted that in some implementations, while the image encoder 291 are trained using the multiple image-text string pairs that containing RGB images only, the image encoder 291 can be used to process a LIDAR image and generate a corresponding image embedding of the LIDAR image in the common parameter space. Optionally, the image-text string pairs used to train the image encoder 291 can (but is not required to) include images in formats other than traditional images. In other words, the image-text string pairs used to train the image encoder 291 is not required to include LIDAR images (or radar images) that are paired with corresponding text strings.

The visual language model 290 can further include a text decoder 295 (e.g., a text generation machine learning model that generates text based on text embedding(s) and/or image embedding(s)). The image embedding IE_X can be processed using the text decoder 295 as input, to generate an output (e.g., one or more text tokens) which includes or can be used to determine text string X that describes image X. Or, the image embedding IE_X can be pre-processed (e.g., mapped to a corresponding text embedding) and then processed using the text decoder 295, to generate the output. The text decoder 295, for instance, can be applied to identify a text embedding in the common parameter space that is closest (most similar) to the image embedding IE_X (or to identify a text embedding that maps/corresponds to the image embedding IE_X), and output the text string X based on the identified text embedding.

Text string X can be utilized to search a configuration file 12 that includes or lists objects or events (e.g., object or event A, object or event B, . . . , object or event M) of interest to a vehicle (e.g., an autonomous vehicle), to determine whether text string X matches any of the objects or events that are of interest to the vehicle. If text string X matches a particular object or event in the configuration file, the vehicle can be controlled responsive to the particular object or event that matches text string X. If text string X does not match any of the objects or events, no controlling signal is generated to control the vehicle in response to the text string X.

As a non-limiting example, if image X captures a vehicle catching a fire, the output of the text decoder 295 (in processing the image embedding IE_X determined from image X) can correspond to (or be used to generate) text string X, e.g., "a picture of a vehicle catching fire". In this non-limiting example, the configuration file 12 can list a plurality of objects or events, including, for example, fire, stray animal, person, traffic cone, etc. Searching the configuration file 12 based on the text string X ("a picture of a vehicle catching fire") can result in a match between the text string X ("a picture of a vehicle catching fire") and the object or event of "fire". In this case, the vehicle can be controlled based on the text string X. For instance, the vehicle can be controlled to reduce its driving speed or to change a lane or route based on the text string X describing a "fire".

It's noted that instead of including text strings describing a wide range of objects or events, the configuration file 12 can alternatively be selected from a plurality of configuration files (e.g., stored locally at a vehicle for which the detection is performed), where the configuration 12 is selected by being specific to scenarios relating to vehicle (e.g., lists only text strings or text tokens relating to vehicles).

It's noted that the match here does not need to be an exact match, but can be a substantial match. For example, a match can be found between a text string of "vehicle fire" (received from typed user input or determined from an image input) and a text token corresponding to "fire" in the configuration file 12. Similarly, a match can be found between a text string of "fire" and text tokens indicating "vehicle fire" for an event of "vehicle fire" in the configuration file 12. The substantial match can exist when a text string (e.g., containing a single word/text token, or a few words) is contained in its entirely in words to which text tokens (in the configuration file 12) corresponds. The substantial match can also exist when a text string (e.g., "vehicle fire") contained words (e.g., "fire") to which a text token in the configuration file 12 corresponds. Alternatively or additionally, the substantial match can exist when a matching score (e.g., 3/5, meaning there are three matching words given the longest length of the text string and of words corresponding to text tokens in the configuration file 12 is "5") between the text string (e.g., the aforementioned text string X) derived from user input (e.g., typed user input or an image input) and words derived from the text tokens in the configuration file 12 satisfies a matching threshold. In some implementations, text tokens/words in the text string, as well as words derived from text tokens in the configuration file 12, can be lemmatized and/or processed to remove stop words (e.g., "catching a fire" in the text string can be lemmatized to become "catch a fire", which can be further processed to remove the stop word "a" in "catch a fire", resulting in a truncated text of "catch fire") before determining whether there is a match between the text string and text tokens (or words derived from the text tokens) describing an object or event in the configuration file 12.

In some implementations, the configuration file 12 can be object-specific, event-specific, or scene-specific, etc. For instance, the configuration file 12 can be customized to list objects or events relating to (and only to) road signs. For instance, the configuration file can list (and only list) a plurality of text strings relating to traffic signs, including but not limited to, "stop sign", "yield sign", "speed limit sign", "speed limit advisory", "not turn on red", "no trucks", "emergency and authorized vehicles only", "merge sign", "HOV start", "HOV end", and "other traffic sign".

Figure 2C:
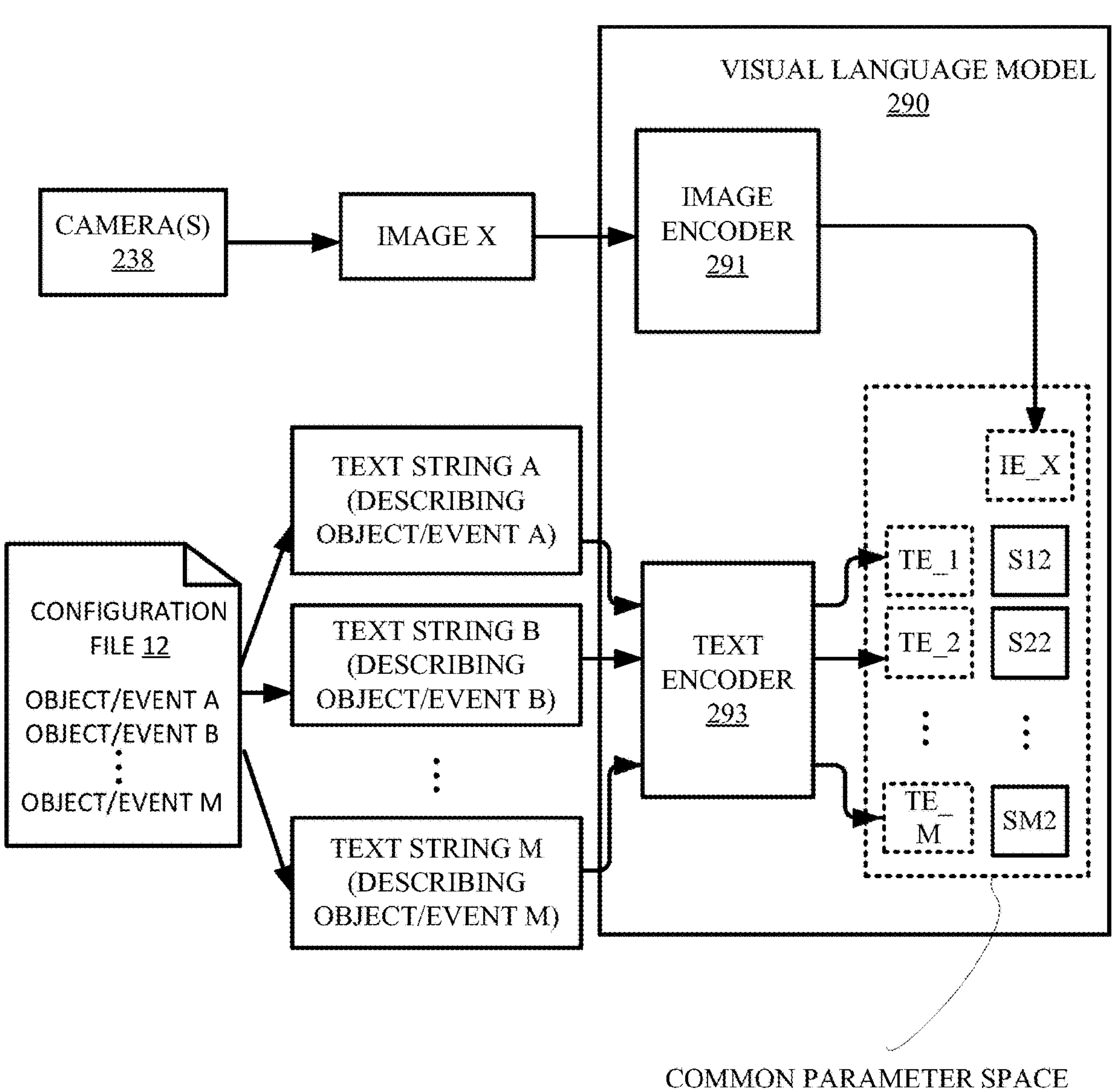
FIG. 2C is a block diagram illustrating use of a visual language model in detecting an object or event of interest to an autonomous vehicle, consistent with some implementations.

FIG. 2C is a block diagram illustrating use of a visual language model in classifying image data, consistent with some implementations. As shown in FIG. 2C, the configuration file 12 can list objects or events (e.g., object or event A, object or event B, . . . , object or event M) of interest to a vehicle. For instance, the configuration file 12 can include: "lane ends ahead right", "lane ends ahead left", "work zone ahead", "work zone ends", "construction", "speed limit", "traffic light", "do not enter", "parking advisory", "lane closed", "right shoulder closed", "shoulder closed", "left shoulder closed", "pedestrian crossing light", "weather clear", "rain", "snow", "fog", "dust", "fouled", etc. In some implementations, text string A can be generated for object or event A, to describe object or event A; text string B can be generated for object or event B, to describe object or event B; text string M can be generated for object or event M, to describe object or event M. In some implementations, text string A, text string B, . . . , and text string M can be, but do not necessarily need to be, in the same format of "a photo showing <specific object or event>".

As shown in FIG. 2C, text string A can be processed by the text encoder to generate a text embedding TE_1 in the common parameter space. Text string B can be processed by the text encoder to generate a text embedding TE_2 in the common parameter space. Text string M can be processed by the text encoder to generate a text embedding TE_M in the common parameter space. Further, image X can be processed using the image encoder 291 as input, to generate an image embedding X in the common parameter space.

In various implementations, a similarity measure can be respectively determined between the image embedding X and each of the text embeddings TE_1, TE_2, . . . , TE_M. Referring to FIG. 2C, a first similarity measure S12 can be determined between image embedding X and text embedding TE_1 determined based on object or event A, a second similarity measure S22 can be determined between image embedding X and text embedding TE_2 determined based on object or event B, . . . , and a Mth similarity measure SM2 can be determined between image embedding X and text embedding TE_M determined based on object or event M. Based on the first, second, . . . , and Mth similarity measures, the visual language model 290 can determine whether image X matches or describes any of object (or event) A, object (or event) B, . . . , and object (or event) M. If the visual language model 290, for instance, determines that image X matches a particular object that is included/listed in the configuration file 12, the visual language model 290 can output one or more text tokens (from which a text string is derived) that correspond to the particular object. The vehicle can be controlled responsive to the text string that corresponds to the particular object.

Figure 3:
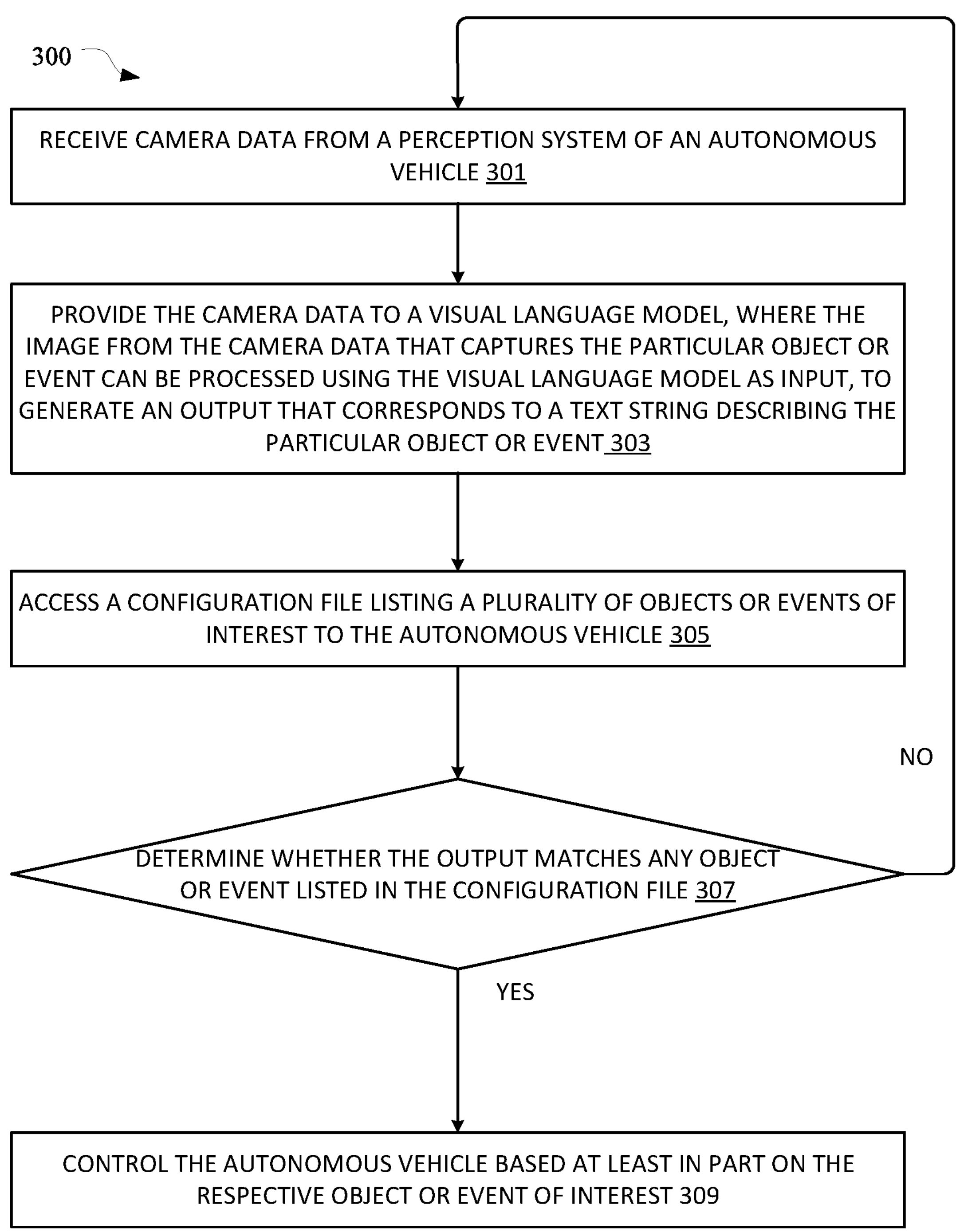
FIG. 3 illustrates an example method for detecting an object or event of interest to an autonomous vehicle, consistent with various implementations.

FIG. 3 illustrates an example method 300 for detecting an object or event of interest to an autonomous vehicle (AV), consistent with various implementations. The operations of method 300 are described with reference to a system that performs the operations, where the system may be or include an autonomous vehicle control system (e.g., 110 in FIG. 1) local to an autonomous vehicle. The autonomous vehicle control system can include one or more processors, one or more memories, and/or other components. While the operations of method 300 are shown in a particular order, this is not meant to be limiting, and one or more of the operations can be re-ordered, omitted, and/or additional operations can be added.

As shown in FIG. 3, the system (e.g., the autonomous vehicle control system) receives, at block 301, sensor data (e.g., camera data, LiDAR data, and/or radar data) from a perception system of an autonomous vehicle. In some implementations, the sensor data (e.g., optical image data, LiDAR data, radar data, etc.) can include an image (e.g., an RGB image, a LIDAR image that contains depth information of captured object(s), or a radar image) capturing a particular object or event of interest in the environment of the autonomous vehicle. In some implementations, the sensor data can be, or can include, a live-stream video (e.g., captured by a front-facing camera of an autonomous vehicle) that includes the image capturing the particular object or event.

In some implementations, the camera data can include images captured by different cameras of the autonomous vehicle, where the different cameras can be of different types and be disposed at different locations (e.g., with respect to the autonomous vehicle). For instance, the camera data can include a first image captured by a front-facing camera of the autonomous vehicle, a second image captured by a rear-facing camera of the autonomous vehicle, a third image captured by a left rear-side facing camera, etc. In some implementations, the perception system of the autonomous vehicle can include one or more vision sensors or one or more non-vision sensors.

In various implementations, the system provides, at block 303, the sensor data (e.g., camera data) to a visual language model, where the image from the sensor data that captures the particular object or event can be processed using the visual language model, to generate an output of the visual language model that corresponds to a text string (e.g., caption) describing the particular object or event. The output of the visual language model, for instance, can include one or more text tokens. Or, the output of the visual language model can be used to derive a text string. As a non-limiting example, the output of the visual language model can include a first token (e.g., a first ID number of "01357" representing an object of "lens flare"), and a second token (e.g., a second ID number of "01558" representing an object of "cloud"). In this non-limiting example, the output of the visual language model can further include a first confidence score (e.g., 0.8) for the first token that indicates an accuracy score of predicting that the image captures the object of "lens flare", and a second confidence score (e.g., 0.9) for the second token that indicates an accuracy score of predicting that the image captures the object of "cloud". It's noted that, in some implementations, only objects corresponding to a confidence score that satisfies a confidence threshold (e.g., 0.7) are indicated in the output of the visual language model.

In some implementations, the visual language model includes a mapping of a corpus of images and a corpus of text to the common parameter space as described above. In some implementations, the visual language model can include one or more neural networks. In some implementations, the one or more neural networks can, for instance, be trained using contrastive learning.

In some implementations, the visual language model can include an image encoder and a text encoder. The image encoder can embed the corpus of images into the common parameter space as described above, and the text encoder can embed the corpus of text strings into the common parameter space. In some implementations, the image encoder and the text encoder can be trained jointly using the corpus of images and the corpus of text strings. For instance, the image encoder and the text encoder can be trained by minimizing distances (in the common parameter space) between images and text strings belonging to the same pairs while maximizing distances (in the common parameter space) between images and text strings that do not belong to the same pairs.

In some implementations, the image capturing the particular object or event of interest in the environment of the autonomous vehicle is not part of the corpus of images used to train the visual language model.

In some implementations, the corpus of text includes a natural language description for each of the corpus of images. The natural language description for each of the corpus of images, for instance, can be a caption that describes a corresponding object or event, in a corresponding image, that is of interest to the autonomous vehicle.

In various implementations, the system accesses, at block 305, a configuration file listing a plurality of objects or events of interest to the autonomous vehicle. Alternatively, the system can select (e.g., based on user input) one configuration file from a plurality of configuration files (e.g., stored at the AV). The configuration file can be any configuration file described above, or any other appropriate file listing object(s) or event(s) of interest to a vehicle (e.g., autonomous vehicle) or other entity. The plurality of objects or events listed in the configuration file can include, for instance, one or more road signs (e.g., a "shoulder drop off" road sign), one or more road or environmental conditions (e.g., dust clouds, section of road removed, fire, road construction, dirt shoulder), and/or one or more static or moving objects (e.g., pedestrians, stray animal, road barriers in motion) within the environment of (or commonly encountered by) the autonomous vehicle.

In some implementations, the configuration file can store a plurality of text describing objects or events affecting operations of the AV. In these implementations, the system can compare the output of the visual language model to the text strings in the configuration file, e.g., by performing a keyword search of the file using the output. For example, the configuration file can include names (e.g., road sign) for the plurality of objects or events of interest to the autonomous vehicle. As another example, the configuration file can include a plurality of text strings (e.g., "road sign ahead right" instead of simply "road sign") respectively describing the plurality of objects or events of interest to the autonomous vehicle. Generally, a text string not only simply identifies a name of an object or event of interest to the autonomous vehicle, but further describes a context (e.g., location) or features of the object or event of interest to the autonomous vehicle.

In some additional implementations, the configuration file can include a list of text tokens (in the form of numeric ID numbers). For instance, the configuration file can include a text token of "01357" that represents/corresponds to an object of "lens flare", and multiple other text tokens representing objects or events affecting operations of the AV. In this instance, the configuration file may not include the text token of "01558" which represents the object of "cloud" (since normal cloud does not typically affect operations of the AV). Correspondingly, as in the aforementioned non-limiting example, when the output of the visual language model include the first token (e.g., a first ID number of "01357" representing an object of "lens flare") and the second token (e.g., a second ID number of "01558" representing an object of "cloud"), it can be determined that the first token (i.e., first ID number of "01357") included in the output of the visual language model matches the text token of "01357" in the configuration file, but the second token does not match any text token in the configuration file. As a result, it can be determined that the object of "lens flare" which is of interest to the AV is identified in the environment of the AV, and the AV can then be controlled based on the identification of the "lens flare" in the environment of the AV.

In various implementations, the system determines, at block 307, whether the output (e.g., the one or more text tokens, or a text string having one or more words) matches any object or event listed or indicated in the configuration file. For example, if the output of the visual language model includes a text token indicating a fire, and "fire" is listed as an event in the configuration file, the system can determine that there is a match. As another example, if the output of the visual language model includes a text token indicating a fire, and an additional text token corresponding to "fire" is listed/stored in the configuration file, the system can determine that there is a match. The text token indicating a fire from the output and the additional text token from the configuration file can both be numeric values (or a combination of letters and numbers), and can be the same or different.

For instance, in some implementations, output of the visual language model (e.g., 01357; 0.8) can be determined as corresponding to detection of "lens flare" with a confidence score of 0.8, and the configuration file can include a text token of "01357" representing an object (i.e., "les flare" of interest to the AV). In this case, it can be determined that there is a match between the output of the visual language model and the configuration file, meaning an object (i.e., "les flare") of interest to the AV is detected, and the detection has a confidence score (e.g., predicted accuracy score) of "0.8". In some other implementations, the configuration file can use a text token of "aabbc" or "ab1a" (or any other appropriate numeric values, letters, or a combination thereof) to correspond to "lens flare", and the system can still determine that there is a match between the output of the visual language model (e.g., 01357; 0.8) and the text token (e.g., "aabbc" or "ab1a") in the configuration file.

In various implementations, the system controls, at block 309, the autonomous vehicle based at least in part on the respective object or event of interest. The system can control the autonomous vehicle in response to the system determining that the output (e.g., the text string) matches a particular object or event listed in the configuration file. For instance, the autonomous vehicle can be controlled to reduce a driving speed of the autonomous vehicle, to vary a driving direction of the autonomous vehicle, to change a driving lane, to turn on a signal, to come to a stop, etc.

Alternatively or additionally, the system can generate a warning message based at least in part on the particular object or event, in response to the system determining that the output (e.g., the one or more text tokens) matches a particular object or event listed in the configuration file. The warning message can be, for instance, "alert, fire detected". The warning message can be rendered audibly and/or visually to alert anyone monitoring, in communication with, or sitting within the autonomous vehicle. Optionally, the warning message can be transmitted to the aforementioned teleassist subsystem 184 via a teleassist session established between a teleassist operator of the teleassist subsystem 184 and the autonomous vehicle which captures the image of the particular object or event.

Figure 4:
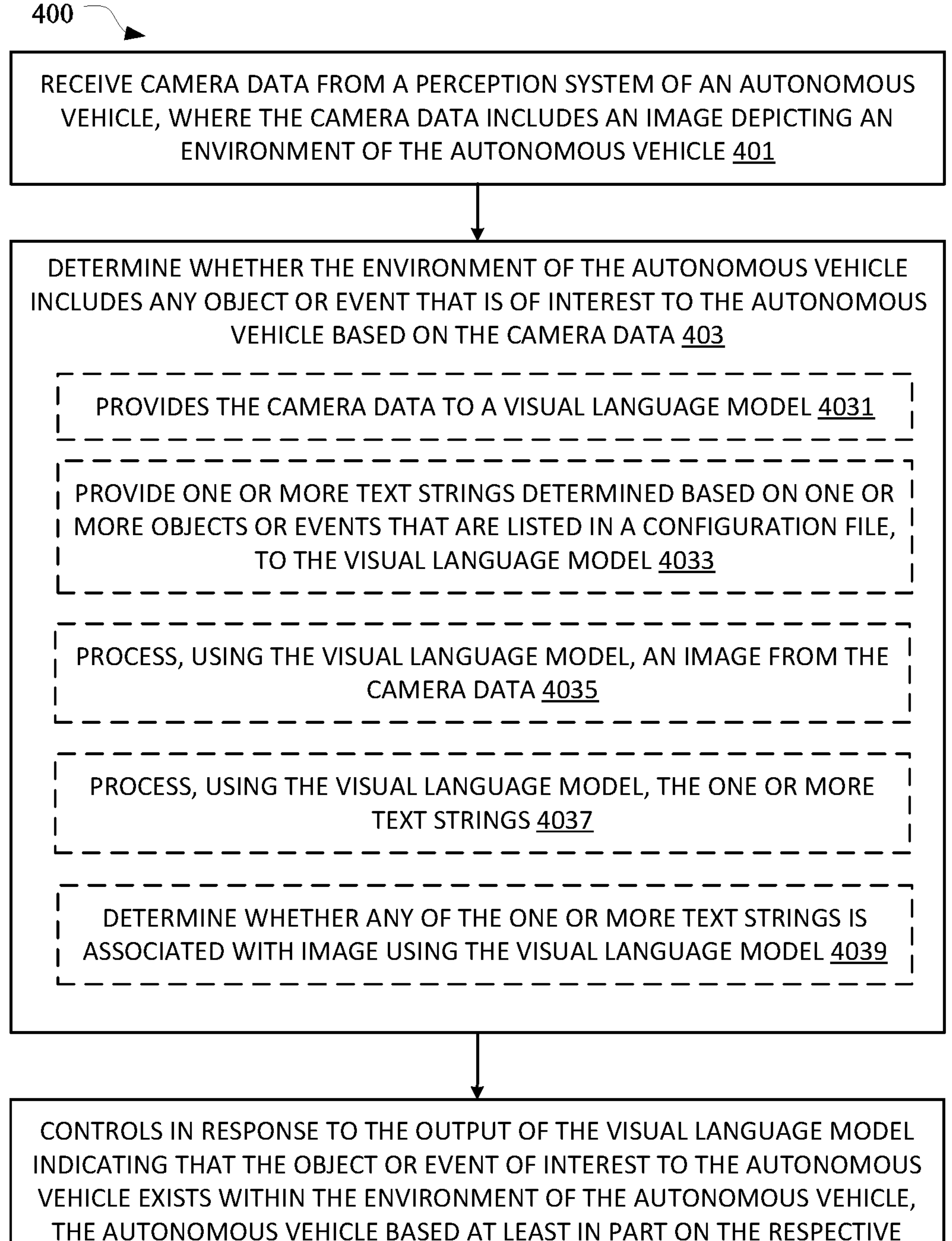
FIG. 4 illustrates another example method for detecting an object or event of interest to an autonomous vehicle, consistent with various implementations.

FIG. 4 illustrates another example method for detecting an object or event of interest to an autonomous vehicle, consistent with various implementations. The operations of method 400 are described with reference to a system that performs the operations, where the system may be or include an autonomous vehicle control system (e.g., 110 in FIG. 1) local to an autonomous vehicle. The autonomous vehicle control system can include one or more processors, one or more memories, and/or other components. While the operations of method 400 are shown in a particular order, this is not meant to be limiting, and one or more of the operations can be re-ordered, omitted, and/or additional operations can be added.

As shown in FIG. 4, the system (e.g., the autonomous vehicle control system) receives, at block 401, camera data (or other sensor data) from a perception system of an autonomous vehicle, where the camera data includes an image depicting an environment of the autonomous vehicle.

In some implementations, the camera data can include images captured by different cameras of the autonomous vehicle, where the different cameras can be of different types and be disposed at different locations (e.g., with respect to the autonomous vehicle). For instance, the camera data can include a first image captured by a front-facing camera of the autonomous vehicle, a second image captured by a rear-facing camera of the autonomous vehicle, a third image captured by a left rear-side facing camera, etc. In some implementations, the perception system of the autonomous vehicle can include one or more vision sensors or one or more non-vision sensors.

In various implementations, the system determines, at block 403, whether the environment of the autonomous vehicle includes any object or event that is of interest to the autonomous vehicle based on the camera data. Optionally, objects or events of interest to the autonomous vehicle can be determined from a locally stored configuration file. The determination at block 403 can include: at block 4031, the system provides the camera data to a visual language model; at block 4033, the system provides one or more text strings determined based on one or more objects or events that are listed in the configuration file, to the visual language model; at block 4035, the system processes, using the visual language model, an image from the camera data; at block 4037, the system processes, using the visual language model, the one or more text strings; and at block 4039, the system determines whether any of the one or more text strings is associated with the image using the visual language model.

As a non-limiting example provided for illustrative purposes, a right front-facing camera of an autonomous vehicle (or another entity) can capture image data, where the image data includes a first image or a first image frame showing an upright tree located on a right side of a road along which the autonomous vehicle is driving, and a second image or a second image frame showing one or more road barriers set up for a construction zone. A configuration file can list a plurality of objects or events of interest to the autonomous vehicle, where the plurality of objects or events can include (and sometimes only include) road barriers, fire, pedestrian, animal. In other words, the plurality of objects or events in the configuration file do not include an upright tree.

In this non-limiting example, a first text string (e.g., "road barrier ahead") can be generated for the object of "road barrier" listed in the configuration file, a second text string (e.g., "fire in the road") can be generated for the event "fire" listed in the configuration file, a third text string (e.g., "pedestrian in the road") can be generated for the object "pedestrian" listed in the configuration file, and a fourth text string (e.g., stray animal) can be generated for the object "animal" listed in the configuration file.

The first, second, third, and fourth text strings can be processed using the visual language model. For instance, the first text string (e.g., "road barrier ahead") can be processed using a text encoder of the visual language model, to generate a first text representation T1 (sometimes referred to as "text embedding") of the first text string (e.g., "road barrier ahead") in the common parameter space. The second text string (e.g., "fire in the road") can be processed using the text encoder of the visual language model, to generate a second text representation T2 for the second text string in the common parameter space. The third text string (e.g., "pedestrian in the road") can be processed using the text encoder of the visual language model, to generate a third text representation T3 for the third text string in the common parameter space. The fourth text string (e.g., stray animal) can be processed using the text encoder of the visual language model, to generate a fourth text representation T4 for the fourth text string in the common parameter space.

Continuing with the non-limiting example above, the first image showing an upright tree located on a right side of a road of the autonomous vehicle can be processed using an image encoder of the visual language model, to generate an image representation 11 (sometimes referred to as "image embedding") for the first image in the common parameter space. Given that the image representation 11, the first text representation T1, the second text representation T2, the third text representation T3, and the fourth text representation T4 are now representations (e.g., numerical vector) in the same space (i.e., the common parameter space), distances between the image representation 11 and the first text representation T1 (the second text representation T2, the third text representation T3, or the fourth text representation T4) can be determined. The distances can be generated, for instance, using a classifier included in, or coupled with the visual language model. The greater the distance, the less similar the image representation is with respect to one of the text representations.

For example, a first distance D1 (e.g. cosine distance) can be determined between the image representation 11 and the first text representation T1, a second distance D2 can be determined between the image representation 11 and the second text representation T2, a third distance D3 can be determined between the image representation 11 and the third text representation T3, and a fourth distance D4 can be determined between the image representation 11 and the fourth text representation T4. In some implementations, based on the first, second, third, and fourth distances D1, D2, D3, and D4, the classifier outputs a plurality of probabilities (in this case, four probabilities) for the plurality of objects or events respectively. For instance, the plurality of probabilities (sometimes referred to as "confidence scores") can indicate a likelihood that the first image matches a respective text string from the first, second, third, or fourth text strings. In other words, the plurality of probabilities can include a first probability (e.g., 0.35) indicating a likelihood that the first image (showing upright tree) matches the first text string (e.g., "road barrier ahead"), a second probability indicating a likelihood (e.g., 0.2) that the first image matches the second text string (e.g., "fire in the road"), a third probability (e.g., 0.25) indicating a likelihood that the first image matches the third text string (e.g., "pedestrian in the road"), and a fourth probability indicating a likelihood that the fourth image (e.g., 0.2) matches the fourth text string (e.g., stray animal). In this instance, the first image can be found to match none of the first, second, third, and fourth text strings as none of the probabilities satisfies a likelihood threshold (e.g., 0.7).

In some implementations, instead of outputting the aforementioned plurality of probabilities, the classifier can output a text string (if any, or text tokens representing an object or event) having the highest probability among the plurality of probabilities and having the probability satisfying a likelihood threshold (which can be a numeric value, e.g., 0.7). In case none of the plurality of probabilities satisfying the likelihood threshold, the classifier can, but do not necessarily need to, output a default text string, such as "not of interest". For instance, given that the first image captures an upright tree on the right side of the road and that the configuration file includes road barrier, fire, pedestrian, animal (but not an upright tree), the classifier can inform the system that the first image does not capture any object or event of interest to an AV (since none of the four probabilities determined based on the first image satisfies the likelihood threshold), based on which, the system can determine to bypass (or discard) the first image and continue processing the second image. In this case, the second image showing one or more road barriers can be processed using the visual language model having (or being coupled to) the classifier (or the detection engine that includes or accesses the visual language model) to output, e.g., a text string of "road barrier ahead" (and/or a confidence score, e.g., 0.8) based on the confidence score indicating that the first text representation T1 of the first text string (e.g., "road barrier ahead") matches the second image which shows road barriers. Such text string, for instance, may be applied to generate a control signal to control operation of the AV based on detection of "road barrier ahead".

In various implementations, the system controls, at block 405, in response to a determination that the object or event of interest to the autonomous vehicle exists within the environment of the autonomous vehicle, the autonomous vehicle based at least in part on the respective object or event of interest to the autonomous vehicle. For instance, given that the output of the classifier (included in or otherwise coupled to the visual language model) that correspond to the second image indicates that one or more road barriers of interest to the autonomous vehicle exist within the environment of the autonomous vehicle, the autonomous vehicle can be controlled correspondingly. For instance, the autonomous vehicle can be controlled to reduce a speed, or to change a lane/route, etc.

Figure 5:
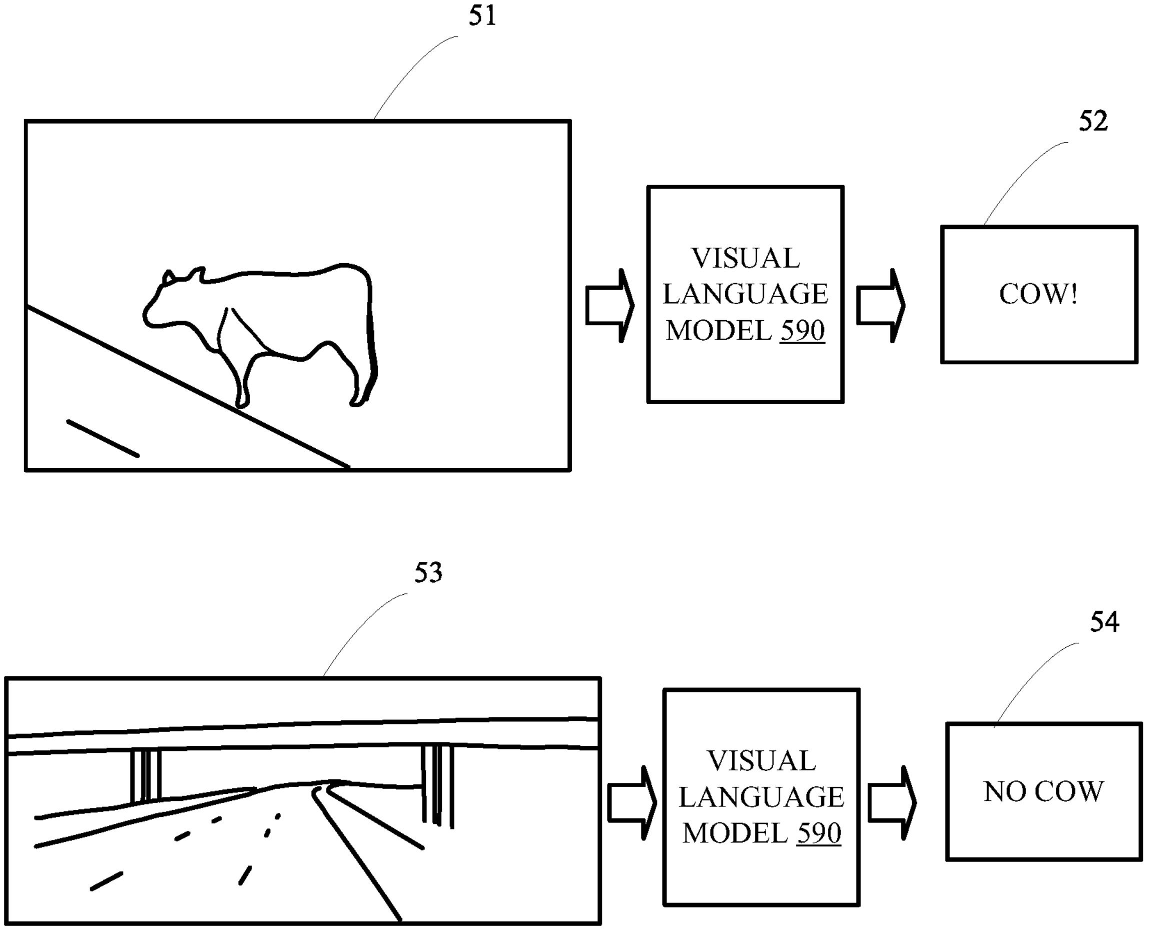
FIG. 5 illustrates object detection using a visual language model, consistent with various implementations.

FIG. 5 illustrates object detection using a visual language model, consistent with various implementations. As shown in FIG. 5, image 51 capturing a stray cow and image 53 capturing a bridge over a road can be provided to a visual language model 590. The image 51 can be processed using the visual language model 590 to generate a classification output, e.g., "no cow". The image 53 can be processed using the visual language model 590 to generate a classification output, e.g., "cow". In these cases, the autonomous vehicle can be controlled responsive to the image 53 (but not responsive to image 51) and can be controlled based on the object (i.e., "cow") of interest to the autonomous vehicle in the image 53. For instance, the autonomous vehicle can be controlled to come to a stop or can be controlled to lower its speed in response to the object of interest being detected from the image 53 using the visual language model.

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill. For example, various components of the aforementioned autonomous vehicle control system of an autonomous vehicle may be implemented using one or more trained machine learning models. For instance, the aforementioned VIS engine, ICD engine, and/or AV status engine can respectively include a machine learning model trained to detect a target object (e.g., flashing light, road-blocking devices, clear-to-proceed signal, secondary inspection signal, etc.) based on processing one or more images (and/or audio data) captured by one or more sensors (e.g., camera, acoustic sensor, etc.) of the autonomous vehicle.

What is claimed is:

1. A computer-implemented method, comprising:

processing, as input, an image from received camera data of an autonomous vehicle, using an image encoder of a visual language model, to generate an image embedding for the image;

processing, as input, the image embedding for the image, using a text decoder of the visual language model to generate an output comprising one or more text tokens;

searching, based on one or more of the text tokens, a plurality of stored text tokens describing a plurality of objects or events;

determining, based on searching the plurality of stored text tokens, that a text token of the output of the text decoder matches a respective one of the plurality of stored text tokens;

identifying, based on the text token of the output of the text decoder that matches the respective one of the plurality of stored text tokens, a respective object or event in an environment of the autonomous vehicle; and controlling the autonomous vehicle based at least in part on the identified respective object or event in the environment of the autonomous vehicle.

2. The method of claim 1, wherein the visual language model includes a mapping of a corpus of text and a corpus of images.

3. The method of claim 1, wherein the visual language model includes both the image encoder and the text decoder.

4. The method of claim 1, wherein the visual language model includes one or more neural networks.

5. The method of claim 2, wherein the image encoder embeds the corpus of images into a common parameter space.

6. The method of claim 2, wherein the corpus of text includes a natural language description for each image of the corpus of images.

7. The method of claim 6, wherein the natural language description for each image of the corpus of images describes an object or event.

8. The method of claim 1, wherein the respective object or event includes a road sign, and/or a road condition, and/or a moving object within the environment of the autonomous vehicle.

9. The method of claim 1, wherein the received camera data is received from a perception system of the autonomous vehicle and includes one or more vision sensors capturing the camera data, or one or more non-vision sensors.

10. The method of claim 1, wherein the processing of the image received from received camera data generates the image embedding in a common parameter space.

11. The method of claim 1, wherein a plurality of images are processed into a corresponding plurality of image embeddings in a common parameter space.

12. The method of claim 1, wherein the plurality of stored text tokens are maintained within a configuration file, the plurality of stored text tokens representing objects or events affecting operations of the autonomous vehicle.

13. The method of claim 12, wherein the stored text tokens represent names of the objects or events.

14. The method of claim 12, wherein the plurality of text tokens are numerical representations and the output of the text decoder are also numerical representations.

15. An autonomous vehicle control system for controlling an autonomous vehicle in an environment, the autonomous vehicle control system comprising:

one or more processors; and memory storing instructions that, when executed by one or more of the processors, cause the autonomous vehicle control system to:

process, as input, an image received as camera data of an autonomous vehicle, using an image encoder of a visual language model, to generate an image embedding for the image;

process, as input, the image embedding for the image, using a text decoder of the visual language model, to generate an output comprising one or more text tokens;

search, based on one or more of the text tokens, a plurality of stored text tokens describing a plurality of objects or events;

determine, based on searching the plurality of stored text tokens, that a text token of the output of the text decoder matches a respective one of the plurality of stored text tokens;

identify, based on the text token of the output of the text decoder that matches the respective one of the plurality of stored text tokens, a respective object or event in an environment of the autonomous vehicle; and control the autonomous vehicle based at least in part on the identified respective object or event in the environment of the autonomous vehicle.

16. The autonomous vehicle control system of claim 15, wherein the visual language model includes a mapping of a corpus of text and a corpus of images.

17. A computer-implemented method, comprising:

processing, as input, an image received from an autonomous vehicle, using an image encoder of a visual language model, to generate an image embedding for the image;

processing, as input, the image embedding for the image, using a text decoder of the visual language model to generate an output comprising one or more text tokens in a common parameter space;

searching, based on one or more of the text tokens, a plurality of stored text tokens in a predefined configuration file describing a plurality of objects or events;

determining, based on searching the plurality of stored text tokens, that a text token of the output of the text decoder matches a respective one of the plurality of stored text tokens in the predefined configuration file;

identifying, based on the text token of the output of the text decoder that matches the respective one of the plurality of stored text tokens, a respective object or event in an environment of the autonomous vehicle; and controlling the autonomous vehicle based at least in part on the identified respective object or event in the environment of the autonomous vehicle.

18. The computer-implemented method of claim 17, wherein the visual language model includes a mapping of a corpus of text and a corpus of images, and wherein the image encoder embeds the corpus of images into a common parameter space.

* * * * *